(12) United States Patent
Ding et al.

(10) Patent No.: US 10,192,293 B2
(45) Date of Patent: Jan. 29, 2019

(54) OBTAINING IMAGE MASK

(71) Applicant: Shenyang Neusoft Medical Systems Co., Ltd., Shenyang, Liaoning (CN)

(72) Inventors: Haoda Ding, Liaoning (CN); Hongyu Guo, Liaoning (CN); Hongbing Hu, Liaoning (CN)

(73) Assignee: Shenyang Neusoft Medical Systems Co., Ltd., Shenyang (CN)

( * ) Notice: Subject to any disclaimer, the term of this patent is extended or adjusted under 35 U.S.C. 154(b) by 191 days.

(21) Appl. No.: 15/229,479

(22) Filed: Aug. 5, 2016

(65) Prior Publication Data

US 2017/0091913 A1 Mar. 30, 2017

(30) Foreign Application Priority Data

Sep. 25, 2015 (CN) .......................... 2015 1 0623795

(51) Int. Cl.
*G06T 7/00* (2017.01)
*G06T 5/00* (2006.01)
(Continued)

(52) U.S. Cl.
CPC ................ *G06T 5/004* (2013.01); *G06T 5/10* (2013.01); *G06T 7/13* (2017.01); *G06T 7/136* (2017.01);
(Continued)

(58) Field of Classification Search
CPC ......... G06T 5/004; G06T 5/10; G06T 7/0085; G06T 11/003
See application file for complete search history.

(56) References Cited

U.S. PATENT DOCUMENTS 4,706,023 A 11/1987 Kanayama
6,076,004 A 6/2000 Den Boef
(Continued)

FOREIGN PATENT DOCUMENTS

CN 101093583 A 12/2007
CN 101447076 A 6/2009
(Continued)

OTHER PUBLICATIONS

Rauscher, Alexander, Sedlacik, Jan, Deistung, Andreas, Mentzel, Hans-Joachim, Reichenbach, Jurgen R. "Susceptibility Weighted Imaging: Data Acquisition, Image Reconstruction and Clinical Applications" Z. Med. Phys. 16 (2006).*
(Continued)

*Primary Examiner* — Kim Vu
*Assistant Examiner* — Molly Delaney
(74) *Attorney, Agent, or Firm* — Kilpatrick Townsend & Stockton, LLP

(57) ABSTRACT

In an example, a method and apparatus for obtaining an image mask is provided. After a magnitude image and a phase image of a to-be-processed image is obtained, magnitude coherent data of each pixel point in the magnitude image and phase coherent data of each pixel point in the phase image may be calculated. Then, a binarization threshold processing may be performed on the magnitude coherent data of each pixel point in the magnitude image to obtain a magnitude image mask. A binarization threshold processing may be performed on the phase coherent data of each pixel point in the phase image to obtain a phase image mask. In this way, an image mask of the to-be-processed image may be obtained by using the magnitude image mask and the phase image mask.

15 Claims, 5 Drawing Sheets

(51) Int. Cl.
G06T 7/174 (2017.01)
G06T 7/194 (2017.01)
G06T 7/136 (2017.01)
G06T 5/10 (2006.01)
G06T 11/00 (2006.01)
G06T 7/13 (2017.01)

(52) U.S. Cl.
CPC .............. *G06T 7/174* (2017.01); *G06T 7/194* (2017.01); *G06T 11/003* (2013.01); *G06T 2207/10072* (2013.01); *G06T 2207/10088* (2013.01); *G06T 2207/20056* (2013.01); *G06T 2207/20212* (2013.01); *G06T 2207/30016* (2013.01)

(56) References Cited

U.S. PATENT DOCUMENTS

| | | | |
|---|---|---|---|
| 8,908,992 | B1 | 12/2014 | Rodriguez |
| 2003/0185454 | A1 | 10/2003 | Simard |
| 2007/0276245 | A1 | 11/2007 | Konofagou |
| 2011/0275926 | A1* | 11/2011 | Du .................... G01R 33/5635 600/410 |

FOREIGN PATENT DOCUMENTS

| | | |
|---|---|---|
| CN | 104107045 A | 10/2014 |
| EP | 2799807 A1 | 11/2014 |
| WO | 2005/055136 A2 | 6/2005 |
| WO | 2014/043833 A1 | 3/2014 |

OTHER PUBLICATIONS

Nhat Trung Doan et al: "Combined magnitude and phase-based Segmentation of the cerebral cortex in 77 MR images o f the elderly", Jan. 1, 2010 (Jan. 1, 2010), XP055340913,Retrieved from the Internet:URL:http://www.asci.tudelft.nl/media/proceedings_asci_conference_2O10/asci2O10_submission_28.pdf.

Ferdinand Schweser et al: "Quantitative susceptibility mapping for investigating subtle susceptibility variations in the human brain ", Neuroimage, Elsevier, Amsterdam, NL,vol. 62, No. 3, May 24, 2012 (May 24, 2012), pp. 2083-2100, XP028450006, ISSN: 1053-8119, DOI:10.1016/J.NEUROIMAGE.2012.05.067.

Isaac Bankman: "Handbook of Medical Image-Processing and Analysis", Jan. 1, 2009 (Jan. 1, 2009), p. 76, XP055340917, Retrieved from the Internet: URL:https: //books.google.de/books?id=AnRPBKb7qHUC&lpg=PA74&ots=mH5uNpGcA6&dq=pet%2Ophase%20magnitude%20%20image%20thresholding&pg=PA76#v=onepage&q&f=false.

Stefano Ferrari: "Image Segmentation", Jan. 1, 2011 (Jan. 1, 2011), pp. 1-22, XP055340923, Retrieved from the Internet: URL:http://homes .di.unimi.it/ferrari/ImgProc2011_12/EI2011_12_16_segmentation_double.pdf.

Borrello J A et al: "Regional Phase Correction of Inversion-Recovery MRImages", Magnetic Resonance in Medicine, John Wiley& Sons, Inc, US, vol. 14, No. 1, Apr. 1, 1990 (Apr. 1, 1990), pp. 56-67, XP000137820, ISSN: 0740-3194.

Daniel S.J. Pandian et al: "Complex threshold method for identifying pixels that contain predominantly noise in magnetic resonance images", Journal of Magnetic Resonance Imaging, vol. 28, No. 3, Sep. 1, 2008 (Sep. 1, 2008), pp. 727-735, XP055340934, US ISSN: 1053-1807, DOI: 10.1002/jmri.21487 * p. 728-729*.

* cited by examiner

OBTAINING IMAGE MASK

CROSS REFERENCE TO RELATED APPLICATIONS

This application is based upon and claims priority to Chinese Patent Application No. 201510623795.6, filed on Sep. 25, 2015, the entire contents of which are incorporated herein by reference.

BACKGROUND

This disclosure relates to obtaining an image mask.

Magnetic Resonance Imaging (MRI) is a commonly-used medical imaging technology, and electromagnetic signals generated from a human organ may be collected by utilizing magnetic resonance to obtain a reconstructed image of the human organ.

To improve the quality of a magnetic resonance image, technologies such as image segmentation or edge detection may be employed to remove noise pollution in the magnetic resonance image. One of the commonly-used technologies for image segmentation and edge detection is a binary threshold method such as Otsu's method. For example, setting a noise threshold, pixel values of pixel points in the magnetic resonance image whose magnitudes are greater than the noise threshold are set to 1, and pixel values of pixel points in the magnetic resonance image whose magnitudes are smaller than the noise threshold are set to 0, in order to obtain an image mask of the magnetic resonance image. Then image segmentation or edge detection is performed on the magnetic resonance image according to the image mask.

NEUSOFT MEDICAL SYSTEMS CO., LTD. (NMS), founded in 1998 with its world headquarters in China, is a leading supplier of medical equipment, medical IT solutions, and healthcare services. NMS supplies medical equipment with a wide portfolio, including CT, Magnetic Resonance Imaging (MRI), digital X-ray machine, ultrasound, Positron Emission Tomography (PET), Linear Accelerator (LINAC), and biochemistry analyser. Currently, NMS' products are exported to over 60 countries and regions around the globe, serving more than 5,000 renowned customers. NMS's latest successful developments, such as 128 Multi-Slice CT Scanner System, Superconducting MRI, LINAC, and PET products, have led China to become a global high-end medical equipment producer. As an integrated supplier with extensive experience in large medical equipment, NMS has been committed to the study of avoiding secondary potential harm caused by excessive X-ray irradiation to the subject during the CT scanning process.

BRIEF DESCRIPTION OF DRAWINGS

Features of this disclosure are illustrated by way of example and not limited in the following figure(s), in which like numerals indicate like elements, in which.

DETAILED DESCRIPTION

For simplicity and illustrative purposes, the present disclosure is described by examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

In examples of this disclosure, a method and apparatus for obtaining an image mask are provided. The following describes examples of this disclosure with reference to the accompanying drawings.

Figure 1:
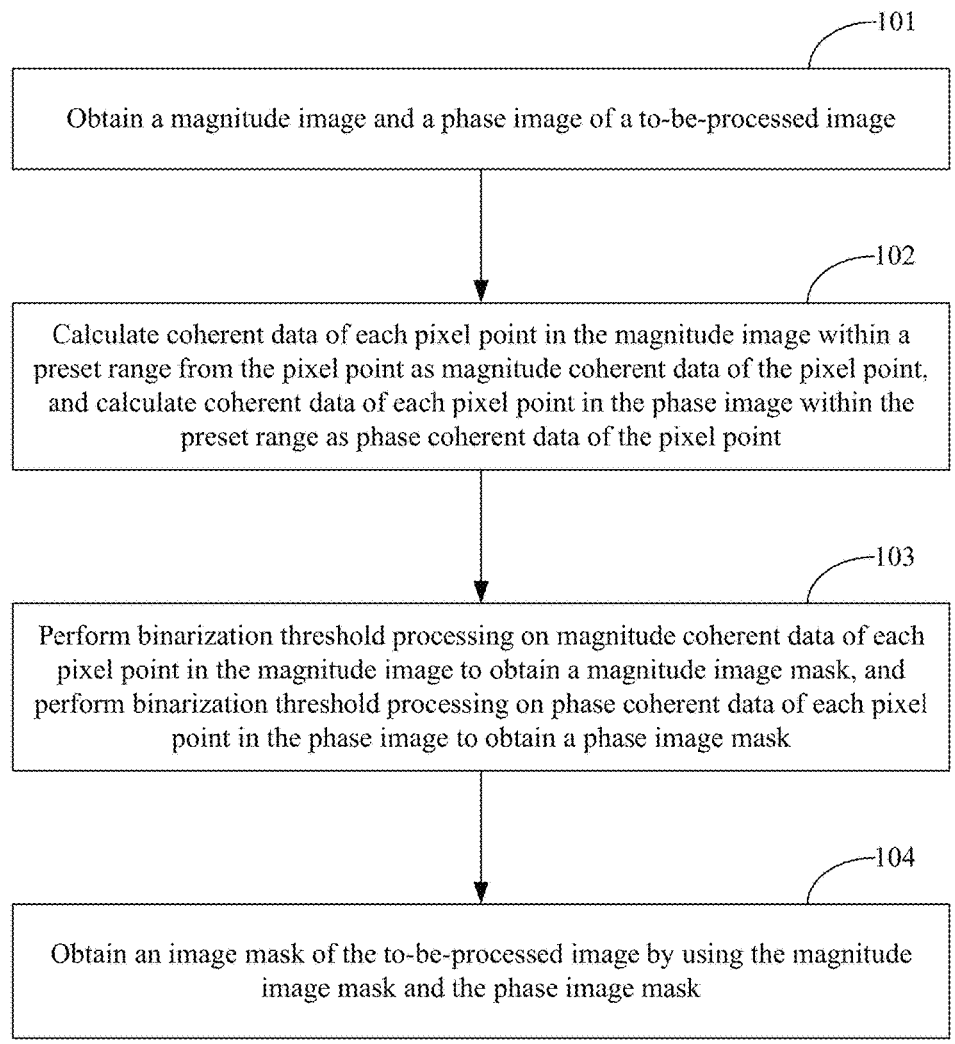
FIG. 1 is a flowchart of a method for obtaining an image mask according to this disclosure.

FIG. 1 is a flowchart of a method for obtaining an image mask according to this disclosure. As shown in FIG. 1, the method may include blocks 101-104.

At block 101, a magnitude image and a phase image of a to-be-processed image may be obtained.

As used herein, the to-be-processed image in the example means a magnetic resonance image. Image data F(x,y,z) of the magnetic resonance image may be a complex number indicated by the following Formula (1):

$$F(x,y,z)=R(x,y,z)+iI(x,y,z) \quad (1)$$

where F(x,y,z) denotes the image data of the magnetic resonance image, R(x,y,z) denotes a real part of the magnetic resonance image, and I(x,y,z) denotes an imaginary part of the magnetic resonance image.

A magnitude image M(x,y,z) of the magnetic resonance image may be indicated by the following Formula (2):

$$M(x,y,z)=\sqrt{R(x,y,z)^2+I(x,y,z)^2} \quad (2)$$

A phase image $\phi(x,y,z)$ of the magnetic resonance image may be indicated by the following Formula (3):

$$\phi(x, y, x) = \arctan\frac{I(x, y, z)}{R(x, y, z)} \quad (3)$$

In some embodiments, after obtaining a magnitude image and a phase image of a to-be-processed image, the method may further include: performing homodyne high-pass filtering or phase unwrapping on the phase image.

Performing homodyne high-pass filtering or phase unwrapping on the phase image may include unwrapping the phase image. Since the phase image is obtained by evaluating an arc tangent of the image data of the to-be-processed image and by contrasting quadrants, a value range of the phase image may be $[-\pi, +\pi]$. The contrasting quadrants refers to extending a value range of an arctan function from $[-\pi/2, +\pi/2]$ to $[-\pi, +\pi]$ by determining a quadrant of a complex number. For example, for a complex number "$-1-i$", since the value range of arctan is $[-\pi/2, +\pi/2]$, only a phase value of "$\pi/4$" may be determined according to an arctan value of "1", whereas other phase values may be unknown. In such a case, since "$-1-i$" is a complex number located in a third quadrant, it may be known that the phase value of the complex number should be $-3\pi/4$ of an equivalent arctan value. As can be seen, compared with a value range $[-\infty, +\infty]$ of an original radian value of the to-be-processed image, the phase image whose radian values are forced to a value range $[-\pi, +\pi]$ is subjected to phase wrapping. Therefore, the phase image may be unwrapped by homodyne high-pass filtering or phase unwrapping so that the value range of the phase image is restored to $[-\infty, +\infty]$, thereby avoiding impact of phase wrapping.

At block 102, coherent data of each pixel point in the magnitude image within a preset range from the pixel point may be calculated as magnitude coherent data of the pixel point, and coherent data of each pixel point in the phase image within the preset range may be calculated as phase coherent data of the pixel point.

A variety of implementation manners may be employed to calculate coherent data of each pixel point in the magnitude image within a preset range as magnitude coherent data of the pixel point.

For example, magnitude coherent data $Q_{i,j,k}^{AM}$ of a pixel point (i, j, k) in the magnitude image may be calculated according to Formula (4):

$$Q_{i,j,k}^{AM} = \frac{1}{\alpha_{AM} d_x d_y d_z} \sum_{l=i-\frac{d_x-1}{2}}^{l=i+\frac{d_x-1}{2}} \sum_{m=j-\frac{d_y-1}{2}}^{m=j+\frac{d_y-1}{2}} \sum_{n=k-\frac{d_z-1}{2}}^{n=k+\frac{d_z-1}{2}} |\hat{p}_{l,m,n}| \quad (4)$$

where $Q_{i,j,k}^{AM}$ denotes the magnitude coherent data of the pixel point (i, j, k) in the magnitude image; $\alpha_{AM}$ denotes normalization constant; $d_x, d_y, d_z$ respectively denote values in direction x, direction y and direction z within the preset range from the pixel point, and direction z is perpendicular to a plane in which direction x and direction y locate; and $|\hat{p}_{l,m,n}|$ is a magnitude of a pixel point (l, m, n) in the magnitude image, where $$l \in \left(i - \frac{d_x-1}{2}, i + \frac{d_x-1}{2}\right), \quad m \in \left(j - \frac{d_y-1}{2}, j + \frac{d_y-1}{2}\right),$$

$$n \in \left(k - \frac{d_z-1}{2}, k + \frac{d_z-1}{2}\right).$$

When the pixel point (l, m, n) lies on boundary, a variety of known technologies such as repetition, circulation, assignment and so on may be employed to process parts of the pixel point (l, m, n) that are beyond image boundary.

In Formula (4), from value ranges of l, m, n, it may be seen that magnitude coherent data of one pixel point in the magnitude image may be an average magnitude of all pixel points within a preset range centering on the pixel point.

It should be noted herein that $\alpha_{AM}$ denotes a normalization constant. In an example of this disclosure, the normalization constant $\alpha_{AM}$ may take the maximum value among magnitudes of all pixel points of the magnitude image. According to another example, the value of the normalization constant $\alpha_{AM}$ may be 1. This is because it is also permitted not to conduct normalization processing in engineering practice.

When the preset range is three-dimensional, it indicates that the to-be-processed image is a three-dimensional image. Direction x and direction y may denote section images produced on a cross section of tissue and organ, and direction z may denote a direction perpendicular to the cross section of tissue and organ. In such a case, the to-be-processed image is a combination of multiple section images obtained in the direction perpendicular to the cross section of tissue and organ. Of course, in this disclosure, $d_z$ may be 1, namely, the preset range is two-dimensional, and the to-be-processed image is a two-dimensional image.

According to another example, magnitude coherent data $Q^{AM}(i,j,k)$ of each pixel point in the magnitude image may be calculated according to Formula (5):

$$Q^{AM}(i, j, k) = \frac{1}{\alpha_{AM}} FFT^{-1}[LFilter(a, b, c) \cdot FFT(|\hat{p}(i, j, k)|)]. \quad (5)$$

where $Q^{AM}(i,j,k)$ denotes the magnitude coherent data of each pixel point in the magnitude image; $\alpha_{AM}$ denotes a normalization constant; $FFT^{-1}$ denotes an inverse Fourier transform; LFilter(a,b,c) denotes a filter, which is a frequency domain filter having a matrix size consistent with that of $FFT(|\hat{p}(i,j,k)|)$, and a cutoff frequency of the filter falls in a preset range; FFT denotes a Fourier transform; $|\hat{p}(i,j,k)|$ denotes a magnitude of each pixel point in the magnitude image; and $LFilter(a,b,c) \cdot FFT(|\hat{p}(i,j,k)|)$ denotes a point-to-point product of the matrix of the filter and the matrix of the magnitude image after the Fourier transform.

Calculating magnitude coherent data of each pixel point in the magnitude image may be regarded as performing low-pass filtering on the magnitude image in a frequency domain by using the filter. This is because noise of an image generally is often high-frequency. The filter may be a common low-pass filter in the technical field, for example, a rectangular filter, a spherical filter, a uniform filter, a Gaussian filter and so on. Taking the uniform filter as an example, the cutoff frequency of the filter falls in a preset range, data within the range of the cutoff frequency may be 1, and data out of the range of the cutoff frequency may be 0.

A variety of implementation manners may be employed to calculate coherent data of each pixel point in the phase image within the preset range as phase coherent data of the pixel point.

According to an example, phase coherent data $Q_{e,f,g}^{VPH}$ of a pixel point (e, f, g) in the phase image may be calculated according to Formula (6):

$$Q_{e,f,g}^{VPH} = \frac{1}{\alpha_{VPH}} \left(1 - \frac{1}{d_x d_y d_z} \sum_{r=e-\frac{d_x-1}{2}}^{r=e+\frac{d_x-1}{2}} \sum_{s=f-\frac{d_y-1}{2}}^{s=f+\frac{d_y-1}{2}} \sum_{t=g-\frac{d_z-1}{2}}^{t=g+\frac{d_z-1}{2}} \frac{\hat{p}_{r,s,t}}{|\hat{p}_{r,s,t}|}\right) + 1. \quad (6)$$

Wherein, $Q_{e,f,g}^{VPH}$ denotes the phase coherent data of the pixel point (e, f, g) in the phase image; $\alpha_{VHP}$ denotes a normalization constant; $d_x, d_y, d_z$ respectively denote values in direction x, direction y and direction z within the preset range, and direction z is perpendicular to a plane in which direction x and direction y locate; and $$\frac{\hat{p}_{r,s,t}}{|\hat{p}_{r,s,t}|}$$

denotes a phase of a pixel point (r, s, t) in the phase image, where $$r \in \left(e - \frac{d_x - 1}{2}, e + \frac{d_x - 1}{2}\right),$$
$$s \in \left(f - \frac{d_y - 1}{2}, f + \frac{d_y - 1}{2}\right),$$
$$t \in \left(g - \frac{d_z - 1}{2}, g + \frac{d_z - 1}{2}\right).$$

When the pixel point (r, s, t) lies on boundary, a variety of known technologies such as repetition, circulation, assignment and so on may be employed to process parts of the pixel points (r, s, t) that are beyond image boundary.

In Formula (6), according to the value ranges of r, s, t, it may be known that phase coherent data of one pixel point in the phase image may be related to an average phase of all pixel points within a preset range by taking the pixel point as a center.

It should be noted herein that $\alpha_{VPH}$ is a normalization constant. In an example of this disclosure, $\alpha_{VPH}$ may take the maximum value among phases of all pixel points of the phase image. According to another example, the value of $\alpha_{VPH}$ may be 1. This is because it is also permitted not to conduct normalization processing in engineering practice.

The preset ranges for calculating magnitude coherent data and calculating phase coherent data may be the same. The phase image is three-dimensional when the magnitude image and the preset range are three-dimensional; and the phase image is two-dimensional when the magnitude image and the preset range are two-dimensional.

According to another example, phase coherent data $Q^{VPH}$ (e,f,g) of each pixel point in the phase image may be calculated according to Formula (7):

$$Q^{VPH}(e, f, g) = \frac{1}{\alpha_{VPH}}\left[1 - FFT^{-1}\left(LFilter(u, v, w) \cdot FFT\left(\frac{\hat{p}(e, f, g)}{|\hat{p}(e, f, g)|}\right)\right)\right] + 1. \quad (7)$$

where $Q^{VPH}$(e,f,g) denotes the phase coherent data of each pixel point in the phase image; $\alpha_{VPH}$ denotes a normalization constant; $FFT^{-1}$ denotes an inverse Fourier transform; LFilter(u, v, w) denotes a filter, which is a frequency domain filter having a matrix size consistent with that of $$FFT\left(\frac{\hat{p}(e, f, g)}{|\hat{p}(e, f, g)|}\right),$$

and a cutoff frequency of the filter falls in a preset range; FFT denotes a Fourier transform;

$$\frac{\hat{p}(e, f, g)}{|\hat{p}(e, f, g)|}$$

denotes a phase of each pixel point in the phase image; and $$LFilter(u, v, w) \cdot FFT\left(\frac{\hat{p}(e, f, g)}{|\hat{p}(e, f, g)|}\right)$$

denotes a point-to-point product of the matrix of the filter and the matrix of the phase image after the Fourier transform.

Calculating phase coherent data of each pixel point in the phase image may be regarded as performing low-pass filtering on the phase image of a frequency domain by using the filter. The filter may be a common low-pass filter in the technical field, for example, a rectangular filter, a spherical filter, a uniform filter, a Gaussian filter and so on. Taking the uniform filter as an example, the cutoff frequency of the filter falls in a preset range, data within the range of the cutoff frequency may be 1, and data out of the range of the cutoff frequency may be 0.

It may be known from the foregoing method for calculating magnitude coherent data and phase coherent data that magnitude coherent data of each pixel point may be related to magnitudes of all pixel points within the preset range by taking the pixel point as a center, and phase coherent data of each pixel point may be related to phases of all pixel points within the preset range by taking the pixel point as a center. Therefore, magnitude coherent data and phase coherent data of each pixel point may reflect correlation between the pixel point and all pixel points within the preset range taking the pixel point as a center. Magnitude coherent data and phase coherent data of each pixel point may be employed to accurately determine whether the pixel point is foreground or background of an image.

At block 103, binarization threshold processing may be performed on magnitude coherent data of each pixel point in the magnitude image to obtain a magnitude image mask, and binarization threshold processing may be performed on phase coherent data of each pixel point in the phase image to obtain a phase image mask.

At block 104, an image mask of the to-be-processed image may be obtained by using the magnitude image mask and the phase image mask.

Binarization threshold processing may be performed on magnitude coherent data of each pixel point in the magnitude image to obtain a magnitude image mask, and binarization threshold processing may be performed on phase coherent data of each pixel point in the phase image to obtain a phase image mask, and the employed binarization threshold processing may be Otsu's method or other binarization threshold processing algorithms, which are not described herein as these methods are generally known to one having ordinary skill in the art.

An image mask of the to-be-processed image may be obtained by using the magnitude image mask and the phase image mask, an intersection of the magnitude image mask and the phase image mask may be obtained as the image mask of the to-be-processed image, or a union of the magnitude image mask and the phase image mask may be obtained as the image mask of the to-be-processed image, which may be specifically set according to actual needs.

Magnitude coherent data and phase coherent data of each pixel point may be employed to accurately determine whether the pixel point is foreground or background of an image, a magnitude image mask may be obtained according to magnitude coherent data of each pixel point in the magnitude image, a phase image mask may be obtained according to phase coherent data of each pixel point in the phase image, and an image mask of the to-be-processed image may be obtained according to the magnitude image mask and the phase image mask. Therefore, the image mask of the to-be-processed image may accurately reflect foreground and background of the to-be-processed image. In this way, not only the impact of noise of the to-be-processed image may be eliminated, but also the image mask of the to-be-processed image may be employed to perform image segmentation and edge detection on the to-be-processed image. In this way, the lack of organizational structure in a low gray region of the to-be-processed image may be avoided, thereby improving precision in image segmentation and edge detection.

Figure 2A:
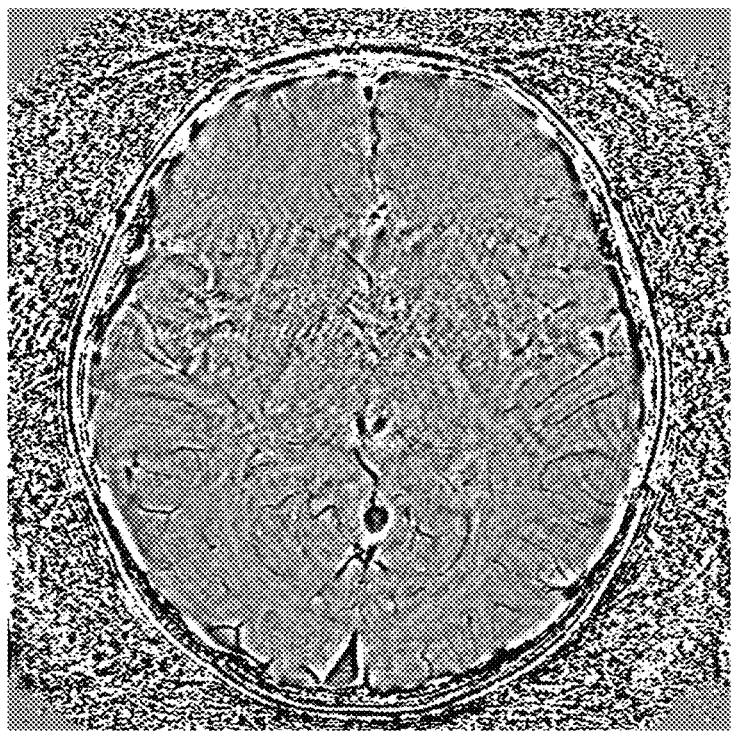
FIG. 2A is an exemplary diagram of a to-be-processed image according to this disclosure.
Figure 2B:
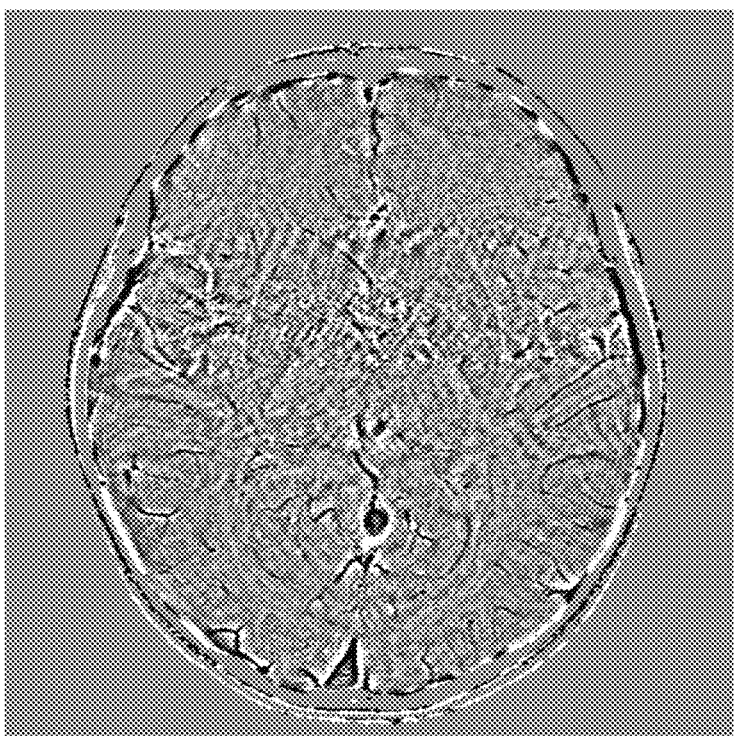
FIG. 2B is a schematic diagram showing a process effect when the image as shown in FIG. 2A is processed with an image mask obtained by using a conventional method.
Figure 2C:
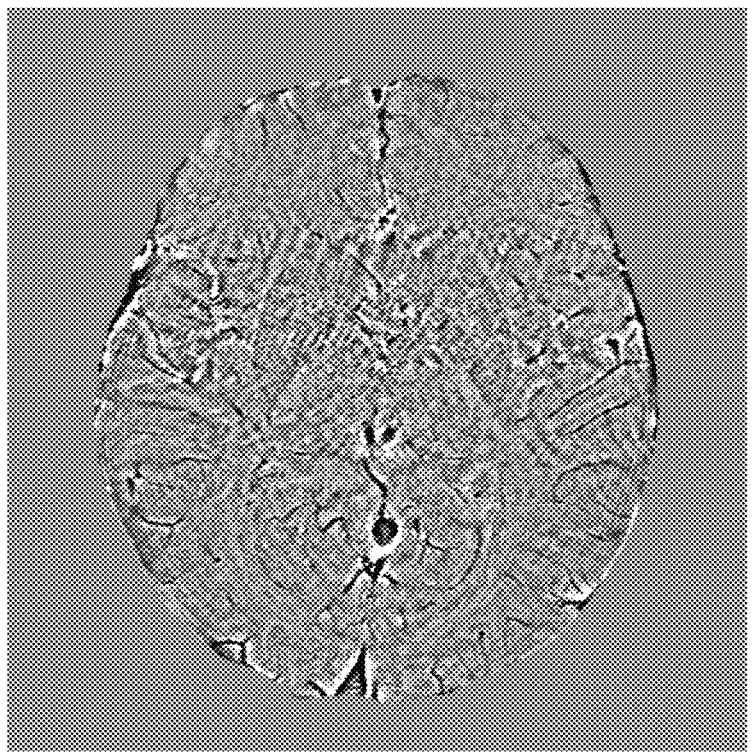
FIG. 2C is a schematic diagram showing a process effect when the image as shown in FIG. 2A is processed with the image mask obtained by using a method according to the present disclosure.
Figure 2D:
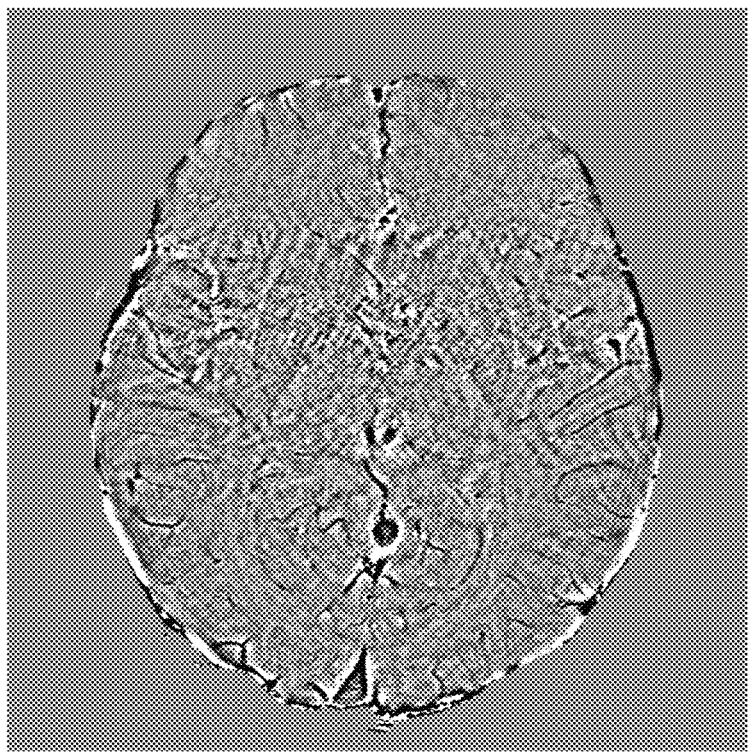
FIG. 2D is a schematic diagram showing a process effect when the image as shown in FIG. 2A is processed with a magnitude image mask obtained by using the method according to this disclosure.
Figure 2E:
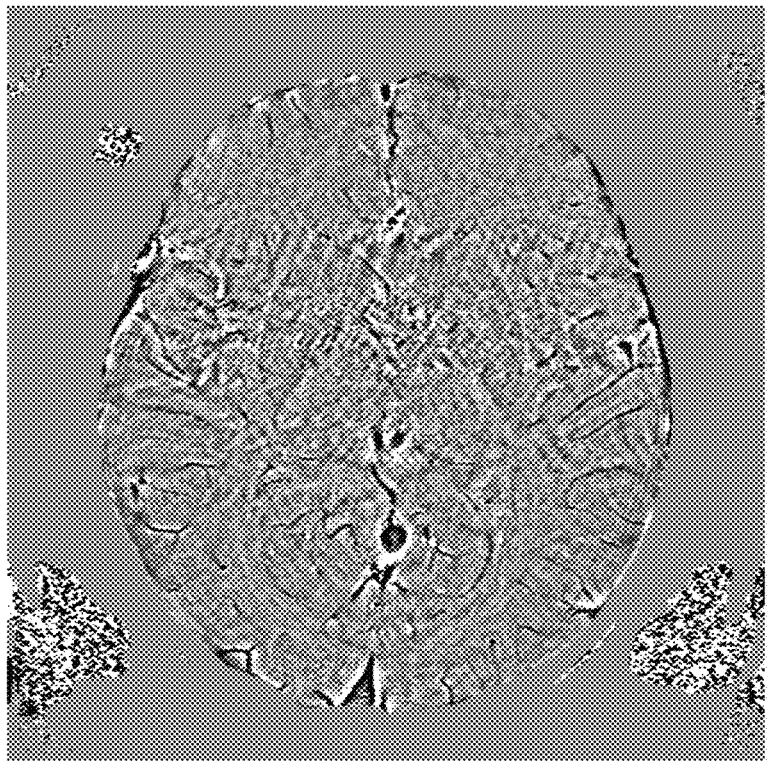
FIG. 2E is a schematic diagram showing a process effect when the image as shown in FIG. 2A is processed by a phase image mask obtained by using the method according to the present disclosure.

FIG. 2A is an example of a to-be-processed image. FIG. 2B is a schematic diagram showing a process effect when the image as shown in FIG. 2A is processed with an image mask obtained by using a conventional method. FIG. 2C is a schematic diagram showing a process effect when the image as shown in FIG. 2A is processed with the image mask obtained by using a method according to this disclosure. FIG. 2D is a schematic diagram showing a process effect when the image as shown in FIG. 2A is processed with a magnitude image mask obtained by using the method according to this disclosure. FIG. 2E is a schematic diagram showing a process effect when the image as shown in FIG. 2A is processed with a phase image mask obtained by using the method according to this disclosure. By comparing FIG. 2A, FIG. 2B and FIG. 2C, it may be known that the image mask obtained on a basis of the method according to this disclosure can more effectively remove noises of the to-be-processed image. Furthermore, by comparing FIG. 2C, FIG. 2D and FIG. 2E, it may be seen that the image mask obtained by integrating the magnitude image mask and the phase image mask is better in a processing effect, mainly manifested as below: firstly, the processing effect of the image mask in middle and low parts and left edges of an image is improved than that of the magnitude image mask; secondly, the processing effect of the image mask on the periphery of an image is apparently improved than that of the phase image mask.

Figure 3:
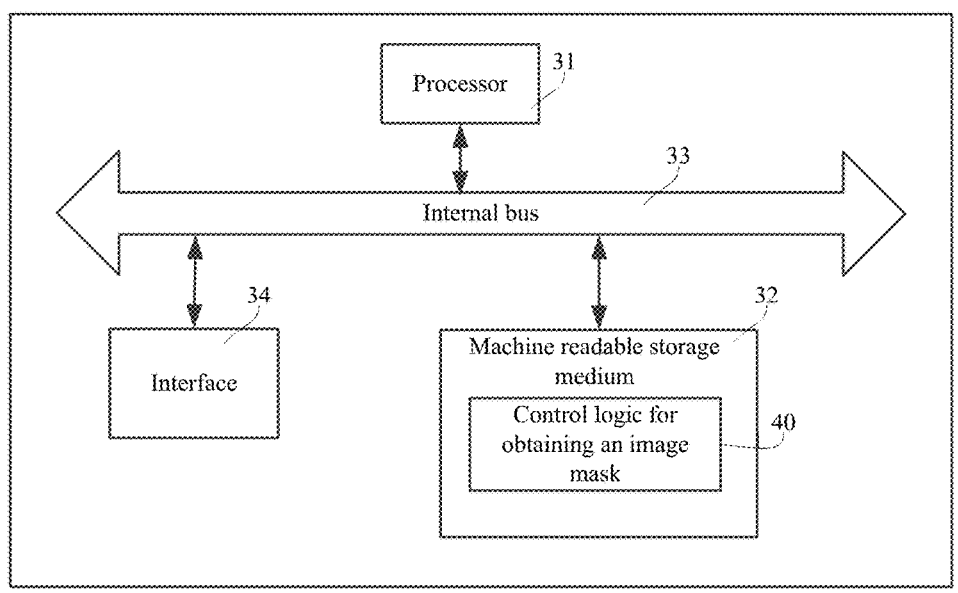
FIG. 3 is a schematic diagram of a hardware structure of an apparatus for obtaining an image mask according to this disclosure.

Referring to FIG. 3, corresponding to the foregoing method, this disclosure also provides an apparatus for obtaining an image mask. As shown in FIG. 3, the apparatus may include a processor 31 and machine-readable storage medium 32, where the processor 31 and the machine-readable storage medium 32 generally may be interconnected via an internal bus 33. In other possible implementation manners, the apparatus may further include an external interface 34 to enable to communicate with other devices or parts.

In different examples, the machine-readable storage medium 32 may include read-only memory (ROM), volatile memory, non-volatile memory, flash memory, a memory drive (such as a hard disk drive), a solid state drive, any type of memory disks (such as an optical disk or a DVD and so on), or similar storage medium or a combination thereof.

Further, control logic 40 for obtaining an image mask is stored on the machine readable storage medium 32. The control logic 40 may functionally include the flowing modules: an image obtaining module 401, a coherent data calculating module 402, a binarization threshold processing module 403, an image mask obtaining module 404 and/or any other modules. The image obtaining module 401 may be configured to obtain a magnitude image and a phase image of a to-be-processed image. The coherent data calculating module 402 may be configured to calculate coherent data of each pixel point in the magnitude image within a preset range as magnitude coherent data of the pixel point, and calculate coherent data of each pixel point in the phase image within the preset range as phase coherent data of the pixel point. The binarization threshold processing module 403 may be configured to perform binarization threshold processing on magnitude coherent data of each pixel point in the magnitude image to obtain a magnitude image mask, and perform binarization threshold processing on phase coherent data of each pixel point in the phase image to obtain a phase image mask. The image mask obtaining module 404 may be configured to obtain an image mask of the to-be-processed image by using the magnitude image mask and the phase image mask.

In some embodiments, the control logic 40 may further include a phase image processing module configured to perform homodyne high-pass filtering or phase unwrapping on the phase image.

In some embodiments, the image mask obtaining module 404 may include a union submodule. The union submodule may be configured to calculate a union of the magnitude image mask and the phase image mask, and take the obtained union as the image mask of the to-be-processed image.

In some embodiments, the image mask obtaining module 404 may include an intersection submodule. The intersection submodule may be configured to calculate an intersection of the magnitude image mask and the phase image mask, and take the obtained intersection as the image mask of the to-be-processed image.

In some embodiments, the coherent data calculating module 402 may include a first calculating module configured to calculate magnitude coherent data $Q_{i,j,k}^{AM}$ of a pixel point (i, j, k) in the magnitude image according to Formula I:

$$Q_{i,j,k}^{AM} = \frac{1}{\alpha_{AM} d_x d_y d_z} \sum_{l=i-\frac{d_x-1}{2}}^{l=i+\frac{d_x-1}{2}} \sum_{m=j-\frac{d_y-1}{2}}^{m=j+\frac{d_y-1}{2}} \sum_{n=k-\frac{d_z-1}{2}}^{n=k+\frac{d_z-1}{2}} |\hat{p}_{l,m,n}|. \quad \text{(Formula I)}$$

where $Q_{i,j,k}^{AM}$ denotes the magnitude coherent data of the pixel point (i, j, k) in the magnitude image; $\alpha_{AM}$ denotes a normalization constant; $d_x, d_y, d_z$ respectively indicate values in direction x, direction y and direction z within the preset range, and direction z is perpendicular to a plane in which direction x and direction y locate; and $|\hat{p}_{l,m,n}|$ denotes a magnitude of a pixel point (l, m, n) in the magnitude image, where $$l \in \left(i - \frac{d_x - 1}{2}, i + \frac{d_x - 1}{2}\right),$$

$$m \in \left(j - \frac{d_y - 1}{2}, j + \frac{d_y - 1}{2}\right),$$

$$n \in \left(k - \frac{d_z - 1}{2}, k + \frac{d_z - 1}{2}\right).$$

In some embodiments, the coherent data calculating module 402 may include a second calculating module. The second calculating module may be configured to calculate magnitude coherent data $Q^{AM}(i,j,k)$ of each pixel point in the magnitude image according to Formula II:

$$Q^{AM}(i, j, k) = \frac{1}{\alpha_{AM}} FFT^{-1}[LFilter(a, b, c) \cdot FFT(|\hat{p}(i, j, k)|)]. \quad \text{(Formula II)}$$

where $Q_{AM}(i,j,k)$ denotes the magnitude coherent data of each pixel point in the magnitude image; $\alpha_{AM}$ denotes a normalization constant; $FFT^{-1}$ indicates an inverse Fourier transform; LFilter(a,b,c) denotes a filter, which is a frequency domain filter, and a cutoff frequency of the filter falls in a preset range; FFT denotes a Fourier transform; and $|\hat{p}(i,j,k)|$ denotes a magnitude of each pixel point in the magnitude image.

In some embodiments, the coherent data calculating module may include a third calculating module. The third calculating module may be configured to calculate phase coherent data $Q_{e,f,g}^{VPH}$ of each pixel point (e, f, g) in the phase image according to Formula III:

$$Q_{e,f,g}^{VPH} = \quad \text{(Formula III)}$$

$$\frac{1}{\alpha_{VPH}}\left(1 - \frac{1}{d_x d_y d_z}\sum_{r=e-\frac{d_x-1}{2}}^{r=e+\frac{d_x-1}{2}}\sum_{s=f-\frac{d_y-1}{2}}^{s=f+\frac{d_y-1}{2}}\sum_{t=g-\frac{d_z-1}{2}}^{t=g+\frac{d_z-1}{2}}\frac{\hat{p}_{r,s,t}}{|\hat{p}_{r,s,t}|}\right) + 1.$$

where $Q_{e,f,g}^{VPH}$ denotes the phase coherent data of the pixel point (e, f, g) in the phase image; $\alpha_{VPH}$ indicates a normalization constant; $d_x, d_y, d_z$ respectively indicate values in direction x, direction y and direction z within the preset range, and direction z is perpendicular to a plane in which direction x and direction y locate; and $$\frac{\hat{p}_{r,s,t}}{|\hat{p}_{r,s,t}|}$$

indicates a phase of a pixel point (r, s, t) in the coherent image, where $$r \in \left(e - \frac{d_x - 1}{2}, e + \frac{d_x - 1}{2}\right),$$
$$s \in \left(f - \frac{d_y - 1}{2}, f + \frac{d_y - 1}{2}\right),$$
$$t \in \left(g - \frac{d_z - 1}{2}, g + \frac{d_z - 1}{2}\right).$$

In some embodiments, the coherent data calculating module may include a fourth calculating module. The fourth calculating module may be configured to calculate phase coherent data $Q^{VPH}(e,f,g)$ of each pixel point in the phase image according to Formula IV:

$$Q^{VPH}(e, f, g) = \frac{1}{\alpha_{VPH}} \quad \text{(Formula IV)}$$

-continued
$$\left[1 - FFT^{-1}\left(LFilter(u, v, w) \cdot FFT\left(\frac{\hat{p}(e, f, g)}{|\hat{p}(e, f, g)|}\right)\right)\right] + 1.$$

where $Q^{VPH}(e,f,g)$ denotes the phase coherent data of each pixel point in the phase image; $\alpha_{VPH}$ indicates a normalization constant; $FFT^{-1}$ indicates an inverse Fourier transform; LFilter(u,v,w) indicates a filter, which is a frequency domain filter, and a cutoff frequency of the filter falls in a preset range; and FFT indicates a Fourier transform, and $$\frac{\hat{p}(e, f, g)}{|\hat{p}(e, f, g)|}$$

indicates a phase of each pixel point in the phase image.

Figure 4:
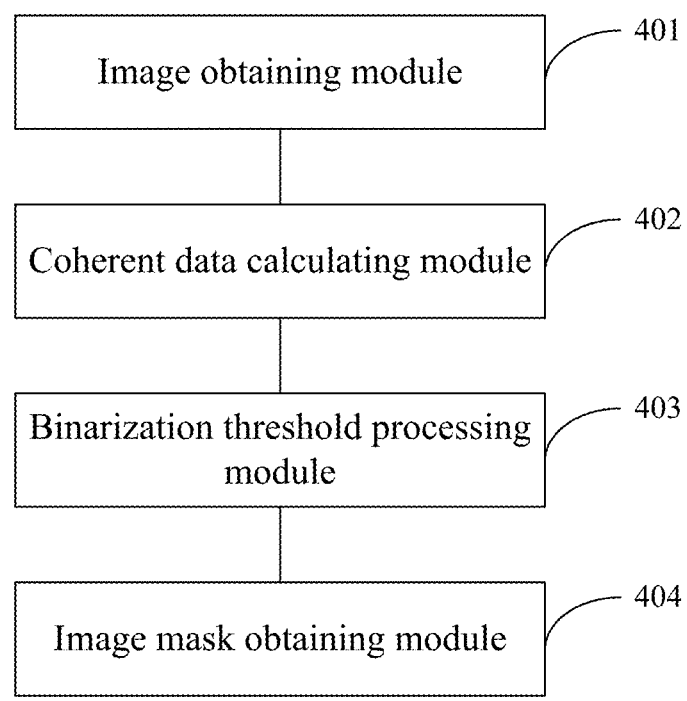
FIG. 4 is a schematic diagram of functional modules of a control logic for obtaining an image mask according to this disclosure.

The functional modules of the control logic for obtaining an image mask as shown in FIG. 4 correspond to the method for obtaining an image mask as shown in FIG. 1, a specific implementation manner thereof may be similar to the method as shown in FIG. 1, description of the method shown in FIG. 1 may be referred to, and thus their detailed descriptions are omitted herein.

The above are only examples in accordance with the present disclosure, which are not intended to limit the present disclosure. Within the spirit and principles of the present disclosure, any changes made, equivalent replacement, or improvement in the protection of the present disclosure is within the scope of the present disclosure.

The methods, processes and units described herein may be implemented by hardware (including hardware logic circuitry), software or firmware or a combination thereof. The term 'processor' is to be interpreted broadly to include a processing unit, ASIC, logic unit, or programmable gate array etc. The processes, methods and functional units may all be performed by the one or more processors; reference in this disclosure or the claims to a 'processor' should thus be interpreted to mean 'one or more processors'.

Further, the processes, methods and functional units described in this disclosure may be implemented in the form of a computer software product. The computer software product is stored in a storage medium and comprises a plurality of instructions for making a processor to implement the methods recited in the examples of the present disclosure.

The figures are only illustrations of examples according to the present disclosure, wherein the units or procedure shown in the figures are not necessarily essential for implementing the present disclosure. Those skilled in the art will understand that the units in the device in the example can be arranged in the device in the examples as described, or can be alternatively located in one or more devices different from that in the examples. The units in the examples described can be combined into one module or further divided into a plurality of sub-units.

Although the flowcharts described show a specific order of execution, the order of execution may differ from that which is depicted. For example, the order of execution of two or more blocks may be changed relative to the order shown. Also, two or more blocks shown in succession may be executed concurrently or with partial concurrence. All such variations are within the scope of the present disclosure.

Throughout the present disclosure, the word "comprise", or variations such as "comprises" or "comprising", will be understood to imply the inclusion of a stated element, integer or step, or group of elements, integers or steps, but not the exclusion of any other element, integer or step, or group of elements, integers or steps.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A method for obtaining an image mask, the method comprising:
   obtaining a magnitude image and a phase image of a to-be-processed image;
   obtaining magnitude coherent data of each pixel point in the magnitude image by calculating coherent data of each pixel point in the magnitude image within a preset range from the pixel point, and
   obtaining phase coherent data of each pixel point in the phase image by calculating coherent data of each pixel point in the phase image within the preset range from the pixel point;
   obtaining a magnitude image mask by performing binarization threshold processing on the magnitude coherent data of each pixel point in the magnitude image, and
   obtaining a phase image mask by performing binarization threshold processing on the phase coherent data of each pixel point in the phase image; and
   obtaining an image mask for the to-be-processed image by using the magnitude image mask and the phase image mask.

2. The method of claim 1, wherein before calculating the coherent data of each pixel point in the phase image within the preset range from the pixel point, the method further comprises:
   performing homodyne high-pass filtering or phase unwrapping on the phase image.

3. The method of claim 1, wherein obtaining the image mask for the to-be-processed image by using the magnitude image mask and the phase image mask comprises:
   calculating a union of the magnitude image mask and the phase image mask, as the image mask of the to-be-processed image.

4. The method of claim 1, wherein obtaining the image mask for the to-be-processed image by using the magnitude image mask and the phase image mask comprises:
   calculating an intersection of the magnitude image mask and the phase image mask, as the image mask of the to-be-processed image.

5. The method of claim 1, wherein calculating the coherent data of each pixel point in the magnitude image within the preset range from the pixel point comprises:
   calculating the magnitude coherent data $Q_{i,j,k}^{AM}$ of a pixel point (i, j, k) in the magnitude image according to a following formula:

$$Q_{i,j,k}^{AM} = \frac{1}{\alpha_{AM} d_x d_y d_z} \sum_{l=i-\frac{d_x-1}{2}}^{l=i+\frac{d_x-1}{2}} \sum_{m=j-\frac{d_y-1}{2}}^{m=j+\frac{d_y-1}{2}} \sum_{n=k-\frac{d_z-1}{2}}^{n=k+\frac{d_z-1}{2}} |\hat{p}_{l,m,n}|;$$

wherein $Q_{i,j,k}^{AM}$ denotes the magnitude coherent data of the pixel point (i, j, k) in the magnitude image,
$\alpha_{AM}$ denotes a normalization constant,
$d_x, d_y, d_z$ respectively denote values in direction x, direction y and direction z within the preset range from the pixel point, wherein direction z is perpendicular to a plane in which direction x and direction y locate in, and
$|\hat{p}_{l,m,n}|$ denotes a magnitude of a pixel point (l, m, n) in the magnitude image, $$l \in \left(i - \frac{d_x-1}{2}, i + \frac{d_x-1}{2}\right), \quad m \in \left(j - \frac{d_y-1}{2}, j + \frac{d_y-1}{2}\right),$$
$$n \in \left(k - \frac{d_z-1}{2}, k + \frac{d_z-1}{2}\right).$$

6. The method of claim 1, wherein calculating the coherent data of each pixel point in the magnitude image within the preset range from the pixel point comprises:
   calculating the magnitude coherent data $Q^{AM}(i,j,k)$ of each pixel point in the magnitude image according to a following formula:

$$Q^{AM}(i,j,k) = \frac{1}{\alpha_{AM}} FFT^{-1}[LFilter(a,b,c) \cdot FFT(|\hat{p}(i,j,k)|)];$$

wherein, $Q^{AM}(i,j,k)$ denotes the magnitude coherent data of each pixel point in the magnitude image,
$\alpha_{AM}$ denotes a normalization constant,
$FFT^{-1}$ denotes an inverse Fourier transform,
LFilter(a,b,c) denotes a filter, the filter is a frequency domain filter, and a cutoff frequency of the filter falls in a preset range,
FFT denotes a Fourier transform, and
$|\hat{p}(i,j,k)|$ denotes a magnitude of each pixel point in the magnitude image.

7. The method of claim 1, wherein calculating the coherent data of each pixel point in the phase image within the preset range from the pixel point comprises:
   calculating the phase coherent data $Q_{e,f,g}^{VPH}$ of a pixel point (e, f, g) in the phase image according to a following formula:

$$Q_{e,f,g}^{VPH} = \frac{1}{\alpha_{VPH}} \left( 1 - \frac{1}{d_x d_y d_z} \sum_{r=e-\frac{d_x-1}{2}}^{r=e+\frac{d_x-1}{2}} \sum_{s=f-\frac{d_y-1}{2}}^{s=f+\frac{d_y-1}{2}} \sum_{t=g-\frac{d_z-1}{2}}^{t=g+\frac{d_z-1}{2}} \frac{\hat{p}_{r,s,t}}{|\hat{p}_{r,s,t}|} \right) + 1;$$

wherein, $Q_{e,f,g}^{VPH}$ denotes the phase coherent data of the pixel point (e, f, g) in the phase image,
$\alpha_{VPH}$ denotes a normalization constant,
$d_x, d_y, d_z$ respectively denote values in direction x, direction y and direction z within the preset range, wherein direction z is perpendicular to a plane in which direction x and direction y locate, and $$\frac{\hat{p}_{r,s,t}}{|\hat{p}_{r,s,t}|}$$

denotes a phase of a pixel point (r, s, t) in the phase image, $$r \in \left(e - \frac{d_x-1}{2}, e + \frac{d_x-1}{2}\right), \quad s \in \left(f - \frac{d_y-1}{2}, f + \frac{d_y-1}{2}\right),$$

-continued $$t \in \left(g - \frac{d_z - 1}{2}, g + \frac{d_z - 1}{2}\right).$$

8. The method of claim 1, wherein calculating the coherent data of each pixel point in the phase image within the preset range from the pixel point comprises:
  calculating the phase coherent data $Q^{VPH}(e,f,g)$ of each pixel point in the phase image according to a following formula:

$$Q^{VPH}(e, f, g,) = \frac{1}{\alpha_{VPH}}\left[1 - FFT^{-1}\left(LFilter(u, v, w) \cdot FFT\left(\frac{\hat{p}(e, f, g)}{|\hat{p}(e, f, g)|}\right)\right)\right] + 1;$$

wherein, $Q^{VPH}(e,f,g)$ denotes the phase coherent data of each pixel point in the phase image,
$\alpha_{VPH}$ denotes a normalization constant,
$FFT^{-1}$ denotes an inverse Fourier transform,
LFilter(u,v,w) denotes a filter, the filter is a frequency domain filter, and a cutoff frequency of the filter falls in a preset range,
FFT denotes a Fourier transform, and $$\frac{\hat{p}(e, f, g)}{|\hat{p}(e, f, g)|}$$

denotes a phase of each pixel point in the phase image.

9. An apparatus for obtaining an image mask, comprising: a processor and a non-transitory storage medium for storing machine-executable instructions corresponding to control logic for obtaining an image mask, and when executed, the machine-executable instructions causing the processor to:
  obtain a magnitude image and a phase image of a to-be-processed image;
  obtain magnitude coherent data of each pixel point in the magnitude image by calculating coherent data of each pixel point in the magnitude image within a preset range from the pixel point, and
  obtain phase coherent data of each pixel point in the phase image by calculating coherent data of each pixel point in the phase image within the preset range from the pixel point;
  obtain a magnitude image mask by performing binarization threshold processing on the magnitude coherent data of each pixel point in the magnitude image, and
  obtain a phase image mask by performing binarization threshold processing on the phase coherent data of each pixel point in the phase image; and
  obtain an image mask for the to-be-processed image by using the magnitude image mask and the phase image mask.

10. The apparatus of claim 9, wherein the machine-executable instructions further cause the processor to:
  perform homodyne high-pass filtering or phase unwrapping on the phase image.

11. The apparatus of claim 9, wherein when obtaining the image mask of the to-be-processed image by using the magnitude image mask and the phase image mask, the machine-executable instructions further cause the processor to:
  calculate a union or intersection of the magnitude image mask and the phase image mask, as the image mask for the to-be-processed image.

12. The apparatus of claim 9, wherein when calculating the coherent data of each pixel point in the magnitude image within the preset range from the pixel point, the machine-executable instructions further cause the processor to:
  calculate the magnitude coherent data $Q_{i,j,k}^{AM}$ of a pixel point (i, j, k) in the magnitude image according to a following formula:

$$Q_{i,j,k}^{AM} = \frac{1}{\alpha_{AM} d_x d_y d_z} \sum_{l=i-\frac{d_x-1}{2}}^{l=i+\frac{d_x-1}{2}} \sum_{m=j-\frac{d_y-1}{2}}^{m=j+\frac{d_y-1}{2}} \sum_{n=k-\frac{d_z-1}{2}}^{n=k+\frac{d_z-1}{2}} |\hat{p}_{l,m,n}|;$$

wherein, $Q_{i,j,k}^{AM}$ denotes the magnitude coherent data of the pixel point (i, j, k) in the magnitude image,
$\alpha_{AM}$ denotes a normalization constant,
$d_x, d_y, d_z$ respectively denote values in direction x, direction y and direction z within the preset range, wherein direction z is perpendicular to a plane in which direction x and direction y locate in, and
$|\hat{p}_{l,m,n}|$ denotes a magnitude of a pixel point (l, m, n) in the magnitude image, $$l \in \left(i - \frac{d_x - 1}{2}, i + \frac{d_x - 1}{2}\right), \quad m \in \left(j - \frac{d_y - 1}{2}, j + \frac{d_y - 1}{2}\right),$$
$$n \in \left(k - \frac{d_z - 1}{2}, k + \frac{d_z - 1}{2}\right).$$

13. The apparatus of claim 9, wherein when calculating the coherent data of each pixel point in the magnitude image within the preset range from the pixel point, the machine-executable instructions further cause the processor to:
  calculate the magnitude coherent data $Q^{AM}(i,j,k)$ of each pixel point in the magnitude image according to a following formula:

$$Q^{AM}(i, j, k) = \frac{1}{\alpha_{AM}} FFT^{-1}[LFilter(a, b, c) \cdot FFT(|\hat{p}(i, j, k)|)];$$

wherein, $Q^{AM}(i,j,k)$ denotes the magnitude coherent data of each pixel point in the magnitude image,
$\alpha_{AM}$ denotes a normalization constant,
$FFT^{-1}$ denotes an inverse Fourier transform,
LFilter(a,b,c) denotes a filter, the filter is a frequency domain filter, and a cutoff frequency of the filter falls in a preset range,
FFT denotes a Fourier transform, and
$|\hat{p}(i,j,k)|$ denotes a magnitude of each pixel point in the magnitude image.

14. The apparatus of claim 9, wherein when calculating the coherent data of each pixel point in the phase image within the preset range from the pixel point, the machine-executable instructions further cause the processor to:
  calculate the phase coherent data $Q_{e,f,g}^{VPH}$ of a pixel point (e, f, g) in the phase image according to a following formula:

$$Q_{e,f,g}^{VPH} = \frac{1}{\alpha_{VPH}}\left(1 - \frac{1}{d_x d_y d_z} \sum_{r=e-\frac{d_x-1}{2}}^{r=e+\frac{d_x-1}{2}} \sum_{s=f-\frac{d_y-1}{2}}^{s=f+\frac{d_y-1}{2}} \sum_{t=g-\frac{d_z-1}{2}}^{t=g+\frac{d_z-1}{2}} \frac{\hat{p}_{r,s,t}}{|\hat{p}_{r,s,t}|}\right) + 1;$$

wherein, $Q_{e,f,g}^{VPH}$ denotes the phase coherent data of the pixel point (e, f, g) in the phase image, $\alpha_{VPH}$ denotes a normalization constant, $d_x, d_y, d_z$ respectively denote values in direction x, direction y and direction z within the preset range, wherein direction z is perpendicular to a plane in which direction x and direction y locate, and $$\frac{\hat{p}_{r,s,t}}{|\hat{p}_{r,s,t}|}$$

denotes a phase of a pixel point (r, s, t) in the phase image, wherein $$r \in \left(e - \frac{d_x-1}{2}, e + \frac{d_x-1}{2}\right), \quad s \in \left(f - \frac{d_y-1}{2}, f + \frac{d_y-1}{2}\right),$$

$$t \in \left(g - \frac{d_z-1}{2}, g + \frac{d_z-1}{2}\right).$$

15. The apparatus of claim 9, wherein when calculating coherent data of each pixel point in the phase image within the preset range, the machine-executable instructions further cause the processor to:

calculate the phase coherent data $Q^{VPH}(e,f,g)$ of each pixel point in the phase image according to a following formula:

$$Q^{VPH}(e, f, g,) = \frac{1}{\alpha_{VPH}}\left[1 - FFT^{-1}\left(LFilter(u, v, w) \cdot FFT\left(\frac{\hat{p}(e, f, g)}{|\hat{p}(e, f, g)|}\right)\right)\right] + 1;$$

wherein, $Q^{VPH}(e,f,g)$ denotes the phase coherent data of each pixel point in the phase image, $\alpha_{VPH}$ denotes a normalization constant, $FFT^{-1}$ denotes an inverse Fourier transform, LFilter(u,v,w) denotes a filter, the filter is a frequency domain filter, and a cutoff frequency of the filter falls in a preset range, FFT denotes a Fourier transform, and $$\frac{\hat{p}(e, f, g)}{|\hat{p}(e, f, g)|}$$

denotes a phase of each pixel point in the phase image.

\* \* \* \* \*